United States Patent
Yabuuchi

(10) Patent No.: US 10,720,641 B2
(45) Date of Patent: Jul. 21, 2020

(54) POSITIVE ELECTRODE ACTIVE MATERIAL FOR LITHIUM ION SECONDARY BATTERY, POSITIVE ELECTRODE FOR LITHIUM ION SECONDARY BATTERY, LITHIUM ION SECONDARY BATTERY, ELECTRONIC DEVICE, AND VEHICLE

(71) Applicant: NATIONAL UNIVERSITY CORPORATION YOKOHAMA NATIONAL UNIVERSITY, Yokohama-shi, Kangawa (JP)

(72) Inventor: Naoaki Yabuuchi, Yokohama (JP)

(73) Assignee: NATIONAL UNIVERSITY CORPORATION YOKOHAMA NATIONAL UNIVERSITY, Yokohama-shi, Kanagawa (JP)

( * ) Notice: Subject to any disclaimer, the term of this patent is extended or adjusted under 35 U.S.C. 154(b) by 212 days.

(21) Appl. No.: 16/068,697

(22) PCT Filed: Jan. 11, 2017

(86) PCT No.: PCT/JP2017/000590
§ 371 (c)(1),
(2) Date: Jul. 9, 2018

(87) PCT Pub. No.: WO2017/122663
PCT Pub. Date: Jul. 20, 2017

(65) Prior Publication Data
US 2019/0020021 A1    Jan. 17, 2019

(30) Foreign Application Priority Data

Jan. 13, 2016  (JP) .................................. 2016-004256

(51) Int. Cl.
*H01M 4/505*   (2010.01)
*H01M 4/131*   (2010.01)
(Continued)

(52) U.S. Cl.
CPC .......... *H01M 4/505* (2013.01); *C01G 23/005* (2013.01); *C01G 45/1221* (2013.01);
(Continued)

(58) Field of Classification Search
None
See application file for complete search history.

(56) References Cited

U.S. PATENT DOCUMENTS

| 6,680,143 B2 | 1/2004 | Thackeray et al. |
| 2002/0114995 A1* | 8/2002 | Thackeray .......... C01G 23/002 429/224 |
| 2015/0099154 A1 | 4/2015 | Okuda et al. |

FOREIGN PATENT DOCUMENTS

| JP | 2007-207626 | 8/2007 |
| JP | B-4307927 | 8/2009 |

(Continued)

OTHER PUBLICATIONS

PCT Search Report and Written Opinion prepared for PCT/JP2017/000590, completed Apr. 7, 2017.
International Preliminary Report on Patentability for PCT/JP2017/000590, dated Oct. 31, 2017.
Doeff et al., "Electrochemical and structural characterization of titanium-substituted manganese oxides based on $Na_{0.44}MnO_2$," *Journal of Power Sources*, 2004; 135:240-248.
(Continued)

*Primary Examiner* — Alix E Eggerding
(74) *Attorney, Agent, or Firm* — Barnes & Thornburg LLP

(57) ABSTRACT

A positive electrode active material for a lithium ion secondary battery has a rock salt type structure represented by General Formula:

$$Li_xTi_{2x-1}Mn_{2-3x}O \quad (0.50<x<0.67) \quad (1)$$

and has an average particle size of 0.5 μm or less.

14 Claims, 8 Drawing Sheets

(51) Int. Cl.
  *H01M 4/485*     (2010.01)
  *C01G 23/00*     (2006.01)
  *C01G 45/12*     (2006.01)
  H01M 10/0525    (2010.01)
  H01M 4/02       (2006.01)

(52) U.S. Cl.
  CPC ........ *C01G 45/1228* (2013.01); *H01M 4/131* (2013.01); *H01M 4/485* (2013.01); *C01P 2002/50* (2013.01); *C01P 2002/72* (2013.01); *C01P 2004/61* (2013.01); *C01P 2004/62* (2013.01); *H01M 10/0525* (2013.01); *H01M 2004/021* (2013.01); *H01M 2004/028* (2013.01); *H01M 2220/20* (2013.01); *H01M 2220/30* (2013.01); *Y02E 60/122* (2013.01); *Y02T 10/7011* (2013.01)

(56) References Cited

FOREIGN PATENT DOCUMENTS

| | | |
|---|---|---|
| JP | A-2012-066944 | 4/2012 |
| JP | 2012-91982 | 5/2012 |
| JP | A-2012-091982 | 5/2012 |
| JP | A-2012-096974 | 5/2012 |

OTHER PUBLICATIONS

European Patent Office Communication for EP 1738417.9, dated May 28, 2019.
European Patent Office Communication for EP 17738417.9, dated May 28, 2019.

\* cited by examiner

POSITIVE ELECTRODE ACTIVE MATERIAL FOR LITHIUM ION SECONDARY BATTERY, POSITIVE ELECTRODE FOR LITHIUM ION SECONDARY BATTERY, LITHIUM ION SECONDARY BATTERY, ELECTRONIC DEVICE, AND VEHICLE

CROSS-REFERENCE TO RELATED APPLICATIONS

This application is the U.S. national phase of PCT/JP2017/000590, filed on Jan. 11, 2017, which claims the benefit of Japanese Patent Application Serial Number 2016-004256, filed on Jan. 13, 2016, the entire disclosures of both of which are incorporated herein by reference.

BACKGROUND OF THE INVENTION

Field of the Invention

The present invention relates to a positive electrode active material for a lithium ion secondary battery, a positive electrode for a lithium ion secondary battery, a lithium ion secondary battery, an electronic device and a vehicle.

Description of Related Art

Lithium ion secondary batteries are widely used as power sources for driving mobile devices such as mobile phones, smartphones and laptops. Lithium ion secondary batteries have a feature of high energy density, but even higher energy density is required for new applications such as electric vehicles and home power storage systems.

In order to further increase the energy density of lithium ion secondary batteries, it is necessary to improve the performance of a positive electrode material. A solid solution type material has been receiving attention as a positive electrode material capable of satisfying such requirements. Various materials have been studied as a solid solution type material. A $Li_2TiO_3$ material is one material that is being studied as a positive electrode material having a large capacity.

For example, in Patent Document 1, a substance in which some of $Li_2TiO_3$ is substituted with one type of metal is described. In addition, for example, in Patent Document 2, a lithium ion secondary battery using a substance having a layered structure represented by $xLiMO_2 \cdot (1-x)Li_2M'O_3$ is described.

In addition, for example, in Patent Document 3, a lithium manganese-based composite oxide represented by $Li_{1+x}(Mn_{1-y}Ti_y)_{1-x}O_2$ (here, $-\frac{1}{3} < x < \frac{1}{3}$, $0.4 \leq y \leq 0.6$) is described.

PATENT DOCUMENTS

[Patent Document 1] Japanese Patent No. 4307927
[Patent Document 2] U.S. Pat. No. 6,680,143 specification
[Patent Document 3] Japanese Unexamined Patent Application, First Publication No. 2012-96974

SUMMARY OF THE INVENTION

A $Li_2TiO_3$ material is a lithium composite oxide capable of further increasing energy density of a lithium ion secondary battery. However, currently, a positive electrode active material for a $Li_2TiO_3$ lithium ion secondary battery exhibiting sufficient charging and discharging capacities has not been found.

For example, a substance in which some Ti is substituted with Mn in the substance described in Patent Document 1 has a small discharging capacity of 22 mAh/g (refer to paragraph 0038 in Patent Document 1).

In addition, for example, in Example 3 of Patent Document 2, a substance having a layered structure represented by $Li(Ti_{0.14}Mn_{0.79}Li_{0.07})O_2$ is described. However, an initial charging capacity is 179 mAh/g, a reversible capacity is 108 mAh/g, and the charging and discharging capacities cannot be said to be sufficient.

In addition, the complex described in Patent Document 3 has a maximum initial charging and discharging capacity of 215 mAh/g (Example 1), and the charging and discharging capacities cannot be said to be sufficient. It is thought that the lithium manganese-based composite oxide of Patent Document 3 actually has a layered structure rather than a rock salt type structure according to a ratio of Mn and Ti, and thus sufficient charging and discharging characteristics are not obtained. It can also be confirmed from the fact that an oxidation number in Example 1 in Patent Document 3 is 3.75, which is a value close to an oxidation number (4.0) of Mn having a layered structure. Even if it has a rock salt type structure, since the lithium manganese-based composite oxide has a large particle size and its composition is not appropriate, sufficient charging and discharging capacities are not obtained.

The present invention has been made in view of the above circumstances and the present invention provides a positive electrode active material for a lithium ion secondary battery made of a $Li_2TiO_3$-based lithium transition metal composite oxide having a rock salt structure through which large charging and discharging capacities can be exhibited, a positive electrode for a lithium ion secondary battery, a lithium ion secondary battery, an electronic device and a vehicle.

In order to solve the above problems, the present invention adopts the following aspects.

A positive electrode active material for a lithium secondary battery according to a first aspect has a rock salt type structure represented by General Formula:

$$Li_xTi_{2x-1}Mn_{2-3x}O \quad (0.50<x<0.67) \tag{1}$$

and a particle size of 0.5 m or less.

In the positive electrode active material for a lithium ion secondary battery according to the above aspect, in General Formula (1), x may satisfy $0.55 \leq x < 0.63$.

In the positive electrode active material for a lithium secondary battery according to the above aspect, in charge compensation according to movement of lithium ions during charging and discharging, the contribution of oxide ions to oxidation reduction may be equal to or greater than the contribution of transition metal ions contained in a solid solution to oxidation reduction.

A positive electrode for a lithium secondary battery according to a second aspect includes the above positive electrode active material for a lithium ion secondary battery, a conductive material, and a binder.

A lithium ion secondary battery according to a third aspect includes the above positive electrode for a lithium ion secondary battery, a negative electrode, and a nonaqueous electrolyte.

In the lithium ion secondary battery according to the above aspect, an initial charging capacity is 260 mAh/g.

An electronic device according to a fourth aspect includes the above lithium ion secondary battery as a drive power source.

A vehicle according to a fifth aspect includes the above lithium ion secondary battery as a drive power source.

According to the present invention, it is possible to provide a positive electrode active material for a lithium ion secondary battery made of a novel Li$_2$TiO$_3$-based lithium transition metal composite oxide through which large charging and discharging capacities can be exhibited.

DETAILED DESCRIPTION OF THE INVENTION

Figure 1:
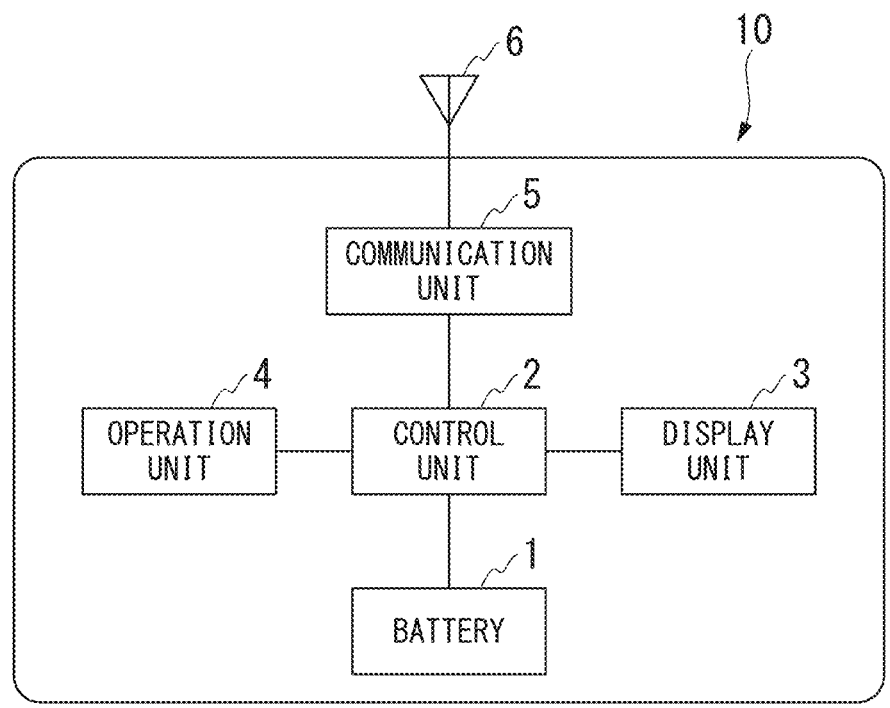
FIG. 1 is a block diagram of main functions of a mobile phone including a lithium ion secondary battery according to the present embodiment as a drive power source.

Forms for implementing a positive electrode active material for a lithium ion secondary battery, a positive electrode for a lithium ion secondary battery, a lithium ion secondary battery, an electronic device and a vehicle according to the present embodiment will be described below.

<Positive Electrode Active Material for Lithium Ion Secondary Battery>

A positive electrode active material for a lithium secondary battery according to one aspect of the present invention is composed of a solid solution of Li$_2$TiO$_3$ and LiMnO$_2$ and has a rock salt type structure. As another aspect, a positive electrode active material for a lithium secondary battery may be composed of a solid solution of Li$_2$TiO$_3$, LiMnO$_2$ and Li$_3$NbO$_4$. The common point between these positive electrode active materials for a lithium secondary battery is that both solid solutions include Li$_2$TiO$_3$ and LiMnO$_2$.

The positive electrode active material for a lithium ion secondary battery may contain other materials within a range in which effects of the present invention are obtained.

When the positive electrode active material for a lithium secondary battery is composed of a solid solution of Li$_2$TiO$_3$ and LiMnO$_2$, it is represented by General Formula $$Li_xTi_{2x-1}Mn_{2-3x}O \quad (0.50<x<0.67) \tag{1}$$

The solid solution of Li$_2$TiO$_3$ and LiMnO$_2$ can be represented by the following formula by adjusting a coefficient of oxygen.

$$xLi_{2/3}Ti_{1/3}O \cdot (1-x)Li_{1/2}Mn_{1/2}O \quad (0.50<x<0.67)$$

When this is changed and represented by MeO (Me: metal) having a rock salt type structure, the above General Formula (1) is obtained.

In addition, when the positive electrode active material for a lithium secondary battery is composed of a solid solution of Li$_2$TiO$_3$, LiMnO$_2$ and Li$_3$NbO$_4$, it is represented by General Formula:

$$Li_xTi_yMn_{(3-y-4x)/2}Nb_{(2x-y-1)/2}O \quad (0<x<1, 0<y<(1-x)) \tag{2}$$

The solid solution of Li$_2$TiO$_3$, LiMnO$_2$ and Li$_3$NbO$_4$ can be represented by the following formula by adjusting a coefficient of oxygen.

$$aLi_{2/3}Ti_{1/3}O \cdot bLi_{1/2}Mn_{1/2}O \cdot (1-a-b)Li_{3/4}Nb_{1/4}O$$
$$(0<a<1, 0<b<1)$$

When this is changed and represented by MeO (Me: metal) having a rock salt type structure, the above General Formula: Li$_{(9-a-3b)/12}$Ti$_{a/3}$Mn$_{b/2}$Nb$_{(1-a-b)/4}$O is obtained.

In addition, when x=(9−a−3b)/12, and y=a/3 are set in order for the obtained general formula to be combined with General Formula (1), General Formula (2) is obtained.

In the positive electrode active material for a lithium secondary battery according to one aspect of the present invention, in charge compensation according to movement of lithium ions during charging and discharging, the contribution of oxide ions to oxidation reduction is equal to or greater than the contribution of transition metal ions contained in a solid solution to oxidation reduction.

That is, in the positive electrode active material for a lithium ion secondary battery according to one aspect of the present invention, in charge compensation according to movement of lithium ions during charging and discharging, the contribution of oxide ions to oxidation reduction is great.

Here, "the contribution of oxide ions to oxidation reduction" or "the contribution of transition metal ions to oxidation reduction" refers to the contribution of oxide ions or transition metal ions to oxidation reduction in charge compensation according to movement of lithium ions during charging and discharging when oxidation reduction reactions reversibly and stably occur.

As an example, it refers to the contribution of oxide ions or transition metal ions to oxidation reduction in charging and discharging when oxidation reduction reactions reversibly occur over at least 30 cycles or more.

For example, when the positive electrode active material for a lithium ion secondary battery is composed of a solid solution of $Li_2TiO_3$ and $LiMnO_2$, in charge compensation according to movement of lithium ions during charging and discharging, there are a contribution according to a change in the valence of $Mn^{3+}/Mn^{4+}$ and a contribution according to a change in the valence of oxide ions of $O_2^{2-}/2O^{2-}$.

For example, when the positive electrode active material for a lithium ion secondary battery is $Li_{0.6}Ti_{0.2}Mn_{0.2}O$ (formula weight: 81.453), if the contribution according to a change in the valence of $Mn^{3+}/Mn^{4+}$ is the main contribution, a theoretical capacity is 131.6 mAh/g. On the other hand, when a theoretical capacity is obtained from a movement amount of lithium ions during charging and discharging, the theoretical capacity is 394.9 mAh/g.

The movement amount of lithium ions during charging and discharging is a sum of the contribution according to a change in the valence of $Mn^{3+}/Mn^{4+}$ and the contribution according to a change in the valence of $O_2^{2-}/2O^{2-}$. That is, the charging and discharging capacities can be increased using not only the contribution according to a change in the valence of $Mn^{3+}/Mn^{4+}$ but also the contribution according to a change in the valence of oxide ions of $O_2^{2-}/2O^{2-}$.

"The contribution of oxide ions to oxidation reduction" and "the contribution of transition metal ions to oxidation reduction" can be examined by measuring changes in the valence of transition metal ions and oxide ions during a charging and discharging cycle. The changes in the valence of transition metal ions and oxide ions can be examined through, for example, soft X-ray absorption spectroscopy (XAS), X-ray photoelectron spectroscopy (XPS), X-ray absorption fine structure analysis (XAFS), or electron energy loss spectroscopy (EELS).

For example, when the positive electrode active material for a lithium ion secondary battery is composed of a solid solution of $Li_2TiO_3$ and $LiMnO_2$, changes in the valence of manganese ions $Mn^{3+}/Mn^{4+}$ and oxide ions of $O_2^{2-}/2O^{2-}$ can be measured through soft X-ray absorption spectroscopy or the like. During charging, the contribution of manganese ions to oxidation reduction reactions can be examined according to a change of manganese ions from $Mn^{3+}$ to $Mn^{4+}$ (generation of $Mn^{4+}$), and the contribution of oxide ions to oxidation reduction reactions can be examined according to a change from $2O^{2-}$ to $O_2^{2-}$ (generation of $O_2^{2-}$ and analogues thereof). On the other hand, during discharging also, the contribution of manganese ions to oxidation reduction reactions can be confirmed according to a change of manganese ions from $Mn^{4+}$ to $Mn^{3+}$ (generation of $Mn^{3+}$) and the contribution of oxide ions to oxidation reduction reactions can be confirmed according to a change from $O_2^{2-}$ to $2O^{2-}$ (generation of $O^{2-}$).

In addition, "the contribution of oxide ions to oxidation reduction" or "the contribution of transition metal ions to oxidation reduction" can be theoretically predicted from the composition.

For example, it is known that $Li_2TiO_3$ is electrochemically inactive. Therefore, for example, when a compositional proportion of Mn in General Formula:

$$Li_xTi_{2x-1}Mn_{2-3x}O \quad (0.50<x<0.67) \tag{1}$$

is larger than a compositional proportion of Ti, "the contribution of transition metal ions to oxidation reduction" is predicted to be great, and when a compositional proportion of Mn and a compositional proportion of Ti are equal, "the contribution of oxide ions to oxidation reduction" is predicted to be great.

In General Formulae (1) and (2), x is $0.50<x<0.67$. When x is a composition in this range, it is easy to maintain a rock salt type structure. In addition, x is preferably $0.52 \leq x<0.65$. When x is a composition in this range, it is easier to maintain a rock salt type structure. In addition, x is more preferably $0.55 \leq x<0.63$. When x is a composition in this range, large charging and discharging capacities are remarkably obtained.

The positive electrode active material for a lithium ion secondary battery according to the present embodiment also contains a slightly deviated composite oxide due to inevitable loss of Li, Ti, Mn, Nb or O.

<Method of Producing Positive Electrode Active Material for Lithium Ion Secondary Battery>

In a method of producing a positive electrode active material for a lithium ion secondary battery according to one aspect of the present invention, salts or oxides of lithium, titanium, manganese, and niobium are prepared and the positive electrode active material can be obtained by a solid-phase method according to compositional proportions.

In addition, the method is not limited to the solid-phase method, but a coprecipitation method, an evaporation drying method, a spray dry method or the like can be used.

The salts or oxides of lithium, titanium, manganese, and niobium may be separately prepared or may be prepared as a composite compound. For example, a lithium titanium composite oxide containing a lithium compound and a titanium compound, a lithium manganese composite oxide containing a lithium compound and a manganese compound, a lithium niobium composite oxide containing a lithium compound and a niobium compound, or the like may be prepared in advance.

As the lithium compound, lithium hydroxide, lithium citrate, lithium oxalate, lithium phosphate, lithium carbonate, or the like can be used, and these may be used alone or two or more thereof may be used in a mixture.

As the titanium compound, metal titanium, titanium oxide, titanium hydroxide, titanium nitrate, titanium chloride, or the like can be used, and these may be used alone or two or more thereof may be used in a mixture. In consideration of stability, titanium oxide ($TiO_2$) or the like is preferably used.

As the manganese compound, metal manganese, manganese oxide, manganese hydroxide, manganese nitrate, manganese carbonate, manganese chloride, manganese iodide, or manganese sulfate can be used, and these may be used alone or two or more thereof may be used in a mixture. Manganese carbonate is preferable.

As the niobium compound, metal niobium, niobium oxide, niobium oxalate, niobium chloride, niobium carbide, or lithium niobate can be used, and these may be used alone or two or more thereof may be used in a mixture. In consideration of stability and easy availability, niobium pentoxide ($Nb_2O_5$) is preferable.

When synthesizing is performed by the solid-phase method, the salts or oxides of lithium, titanium, manganese, and niobium are adjusted so that a target active material has desired compositional proportions and the adjusted mixture is calcined, and thereby a positive electrode active material for a lithium ion secondary battery is obtained.

Regarding the amount of a lithium raw material, since a part of the lithium raw material is eliminated during calcination, the lithium raw material is preferably contained in an excessive amount of about 1 to 5%. In addition, a calcination temperature depends on a type of a lithium salt to be used, and is preferably 500° C. or higher, and more preferably 800° C. or higher in order to increase the crystallinity of a positive electrode active material for a lithium ion secondary battery to be generated. When the crystallinity of a positive electrode active material for a lithium ion secondary battery to be generated is higher, charging and discharging characteristics are improved.

<Positive Electrode for a Lithium Ion Secondary Battery>

A positive electrode for a lithium ion secondary battery according to one aspect of the present invention includes the positive electrode active material for a lithium ion secondary battery, a conductive material, and a binder.

The positive electrode for a lithium ion secondary battery according to one aspect of the present invention may include the positive electrode active material for a lithium ion secondary battery alone as a positive electrode active material or may additionally include one or more known positive electrode active materials for a lithium ion secondary battery.

In addition, when the positive electrode for a lithium ion secondary battery according to one aspect of the present invention is produced, the positive electrode active material for a lithium ion secondary battery is preferably ground by ball milling or the like.

Figure 3:
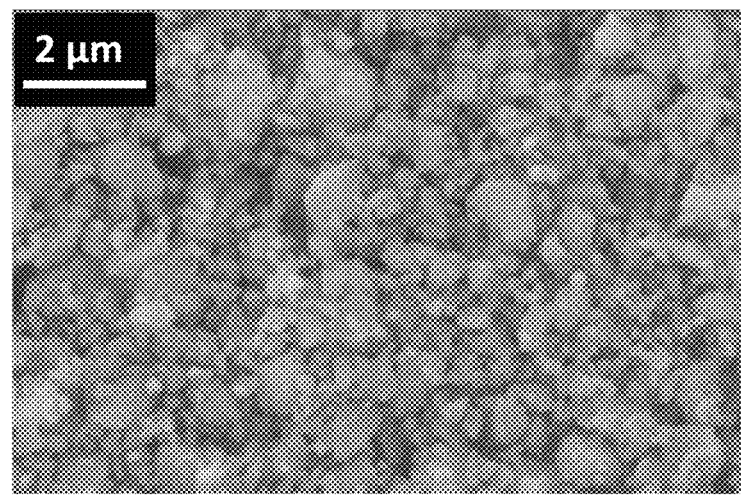
FIG. 3 is a microscopic image of a substance after a positive electrode active material for a lithium ion secondary battery is ground by ball milling when a positive electrode for the lithium ion secondary battery is produced.

The average particle size of the ground positive electrode active material for a lithium ion secondary battery is preferably 0.5 µm or less. FIG. 3 is a microscopic image of a substance after the positive electrode active material for a lithium ion secondary battery is ground by ball milling when the positive electrode for a lithium ion secondary battery is produced. Here, the average particle size is an average value of particle sizes of 20 arbitrary particles in the optical microscope image. The particle size of the positive electrode active material for a lithium ion secondary battery before grinding is performed by ball milling is 2 to 4 µm, and the maximum particle size of the ground substance is about 1 µm.

The average particle size of the positive electrode active material for a lithium ion secondary battery using oxidation reduction reactions of a transition metal such as a general layered oxide is 1 to 5 µm. The average particle size is a factor that greatly contributes to charging and discharging characteristics. It was newly found through study that, when the average particle size is set to 0.5 µm or less and uniform compositing with a carbon material is performed, charge compensation according to oxide ions becomes active and initial charging and discharging characteristics of the lithium ion secondary battery become 260 mAh/g or more. In addition, it was newly found that an actually measured value of initial charging and discharging characteristics with respect to a Li-based theoretical capacity can be 70% or more.

In addition, when ball milling or the like is performed, for example, a conductive material such as carbon is preferably mixed with the positive electrode active material for a lithium ion secondary battery. When a grinding process is performed by ball milling or the like, the conductive material uniformly adheres to a surface of the ground positive electrode active material for a lithium ion secondary battery. A complexing agent in which a conductive material such as carbon uniformly adheres to a surface of a positive electrode active material for a lithium ion secondary battery has excellent charging and discharging characteristics because charge compensation according to oxide ions occurs. In addition, in order to avoid unnecessary reactions, the grinding process is preferably performed in an inert gas atmosphere.

<Lithium Ion Secondary Battery>

A lithium ion secondary battery according to one aspect of the present invention includes the positive electrode, a negative electrode, and a nonaqueous electrolyte, and includes components essential for a general lithium ion secondary battery.

<Applications of Lithium Ion Secondary Battery>

Applications of the lithium ion secondary battery are not particularly limited as long as the battery can be used as a drive power source or a power storage source for a machine, an apparatus, an instrument, a device, or a combined system thereof.

As exemplary application examples of the lithium ion secondary battery, portable electronic devices such as a mobile phone, a smartphone, a laptop, and a personal digital assistant (PDA) which include the lithium ion secondary battery as a drive power source.

FIG. 1 shows a block diagram of main functions when a mobile phone is used as an exemplary example of an electronic device.

A mobile phone 10 includes a battery 1 including at least one lithium ion secondary battery of the present invention, a control unit 2, a display unit 3, an operation unit 4, a communication unit 5, and an antenna 6.

The control unit 2 includes a CPU and a memory, and controls various devices to be mounted.

The display unit 3 displays various types of information such as operation menus, the operation unit 4 is an input interface for performing operations of the mobile phone, and an input from the operation unit 4 is processed by the control unit 2 and an operation of the mobile phone is performed. The communication unit 5 performs wireless communication with a mobile phone base station through the antenna 6.

Figure 2:
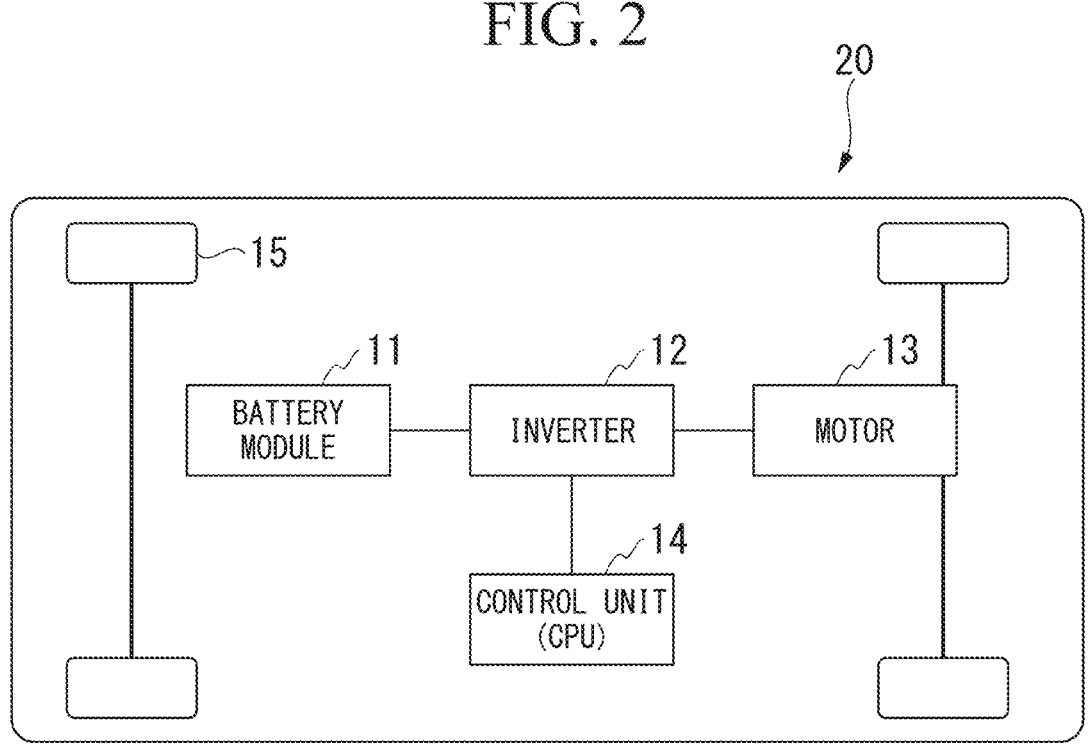
FIG. 2 is a block diagram of a drive system of an electric vehicle including the lithium ion secondary battery according to the present embodiment as a drive power source.

FIG. 2 shows a schematic plan view of a drive system in which an electric vehicle is exemplified as a vehicle as another application of the lithium ion secondary battery.

An electric vehicle 20 includes a battery module 11 including at least one lithium ion secondary battery of the present invention, an inverter 12, a motor 13, and a control unit 14.

The electric vehicle 20 is driven when power is supplied from the battery module 11 to the motor 13 through the inverter 12. Power regenerated by the motor 13 during deceleration is stored in the battery module 11. The control unit 14 controls the inverter 12 so that torque is output in the same direction as rotation of a wheel 15 when an accelerator pedal is operated, and controls the inverter 12 so that torque is output in a direction opposite to a direction of rotation of a wheel when a brake pedal is operated.

While FIG. 2 shows an exemplary case in which the battery is applied to the electric vehicle, the battery can be applied as a storage battery for storing power for running in a hybrid vehicle including a motor for running and an engine or a storage battery for storing power for accessory driving. The battery can also be applied as a storage battery for storing power for accessory driving in an engine vehicle. In this case, a storage battery for storing power for accessory driving is charged by power generated by an alternator connected to the engine.

EXAMPLES

While the present invention will be described below in detail with reference to examples, the present invention is not limited to such examples.

Example 1-1

$Li_{0.6}Ti_{0.2}Mn_{0.2}O$ corresponding to General Formula:

$Li_xTi_{2x-1}Mn_{2-3x}O$ (x=0.6)

In order to obtain $Li_{0.6}Ti_{0.2}Mn_{0.2}O$, $Li_2CO_3$ (commercially available from Wako Pure Chemical Corporation), $TiO_2$ (commercially available from Kanto Chemical Co., Inc), and $Mn_2O_3$ (obtained by calcining manganese carbonate (commercially available from Kishida Chemical Co., Ltd.) at 700° C.) were weighed out at a molar ratio of 1.5:1:0.5. Then, the weighed out powders were mixed so that they became sufficiently uniform, and were then pelletized, and calcined at 900° C. for 12 hours, and thereby $Li_{0.6}Ti_{0.2}Mn_{0.2}O$ was obtained. In this case, a calcination atmosphere was an inert gas atmosphere.

Next, the obtained powders were put into a pot made of zirconia into which a ball made of zirconia was added, set in a planetary ball mill (model number pluverisette 7 commercially available from FRITSCH), and mixed at 300 rpm for 12 hours. FIG. 3 is a microscopic image of a substance after a positive electrode active material for a lithium ion secondary battery is ground by ball milling when a positive electrode for the lithium ion secondary battery is produced.

Figure 4:
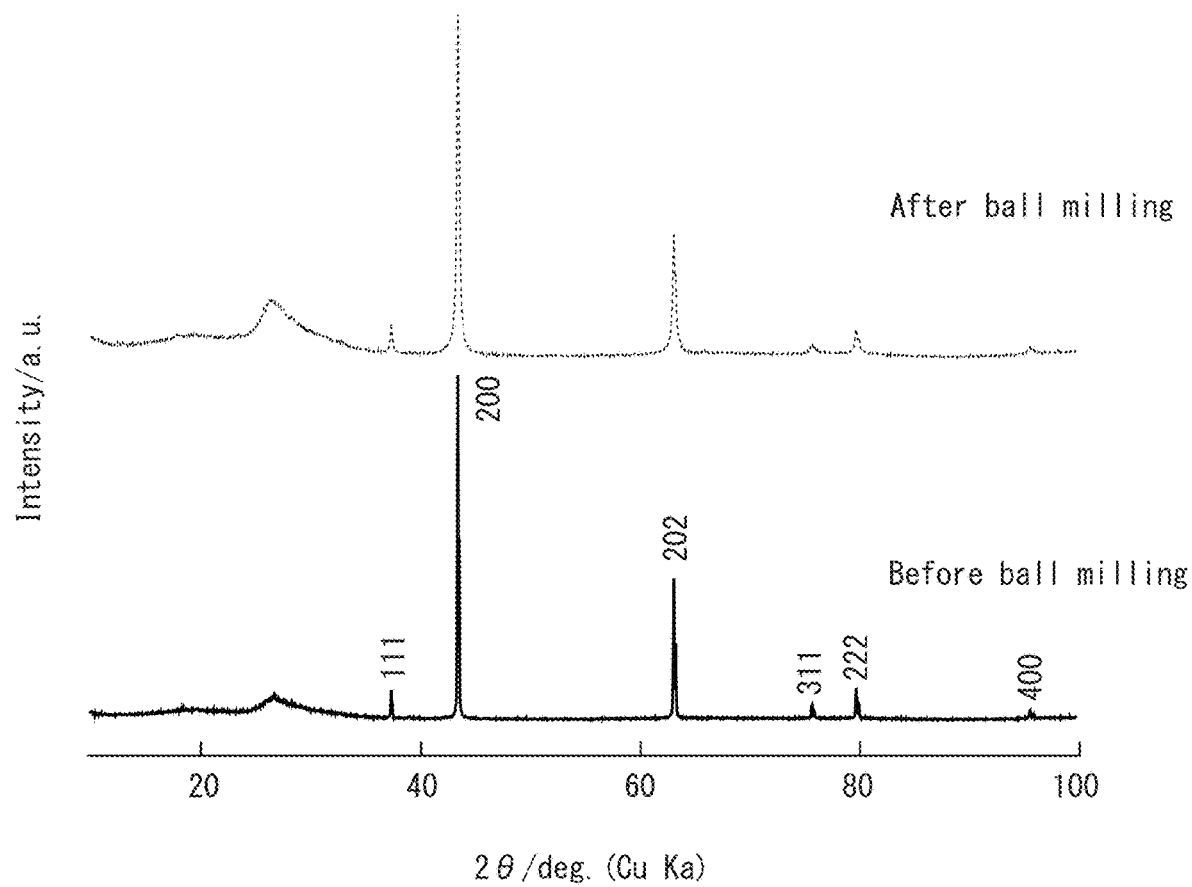
FIG. 4 shows X-ray diffraction images before and after ball milling is performed on a powder of a composite oxide obtained in Example 1-1.

FIG. 4 shows X-ray diffraction images before and after ball milling was performed on the powder of the composite oxide obtained in Example 1-1. The horizontal axis represents a diffraction angle (2θ) and the vertical axis represents an intensity. It was confirmed that a crystal structure of the composite oxide obtained in Example 1 from the X-ray diffraction image was a rock salt type structure. In addition, the composition was analyzed by inductivity coupled plasma (ICP) analysis, and it was confirmed that the composition was $Li_{0.6}Ti_{0.2}Mn_{0.2}O$ (x=0.6).

(Evaluation of Battery Characteristics)

A bipolar electrochemical cell for evaluation was produced as follows using the obtained composite oxide $Li_{0.6}Ti_{0.2}Mn_{0.2}O$ (x=0.6) as a positive electrode active material for a lithium ion secondary battery, and battery characteristics thereof were evaluated.

First, the obtained positive electrode active material $Li_{0.6}Ti_{0.2}Mn_{0.2}O$ (x=0.6) and acetylene black (AB) as a conductive material were mixed at a weight ratio of 80:20. A polyvinylidene fluoride (PVDF) binder that was dissolved in N-methyl pyrrolidone (NMP) was added to this mixture to prepare a slurry. In this slurry, a weight ratio of positive electrode active material:AB:PVDF was 76.5:13.5:10. This slurry was applied to an aluminum foil as a current collector and dried, and pressing was then performed to produce a positive electrode.

A bipolar electrochemical cell for evaluation in which a counter electrode was a lithium foil was produced using this positive electrode.

In this electrochemical cell, a solution in which $1M-LiPF_6$ was dissolved in EC/DMC (volume ratio of 1:1) was used as an electrolytic solution, and a charging and discharging test was performed. The charging and discharging test was performed at 50° C., a current density of 5 mA/g, and in a voltage range of 1.5 to 4.8 V.

Figure 5:
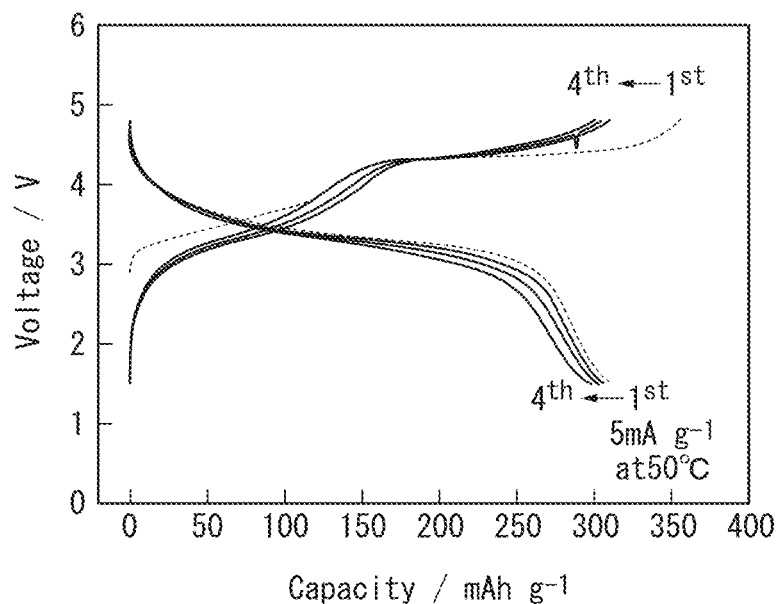
FIG. 5 shows charging and discharging characteristics of an electrochemical cell obtained using a composite oxide Li$_{0.6}$Ti$_{0.2}$Mn$_{0.2}$O (x=0.6) of Example 1-1 as a positive electrode active material.

FIG. 5 shows charging and discharging characteristics of an electrochemical cell obtained using the composite oxide $Li_{0.6}Ti_{0.2}Mn_{0.2}O$ (x=0.6) of Example 1-1 as a positive electrode active material. Curves upward to the right correspond to charging curves and curves downward to the right correspond to discharging curves.

Large charging and discharging capacities in which a charging capacity was 350 mAh/g and a discharging capacity was 315 mAh/g in the first cycle were obtained. The initial charging capacity of 350 mAh/g was a very large value corresponding to about 89% of the Li-based theoretical capacity of 394.9 mAh/g. These large charging and discharging capacities were caused by oxidation reduction reactions of oxide ions ($O^{2-}/O_2^{2-}$).

Figure 6:
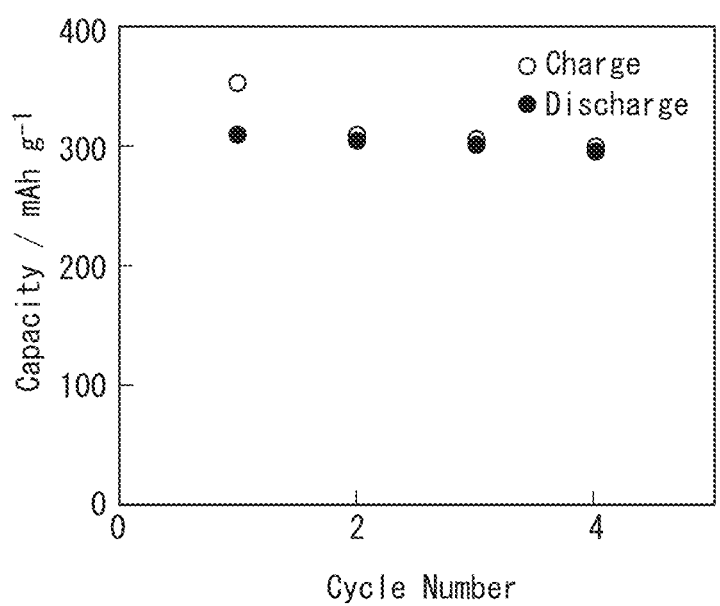
FIG. 6 shows evaluation results of a capacity retention characteristic of a discharging capacity of an electrochemical cell using a composite oxide Li$_{0.6}$Ti$_{0.2}$Mn$_{0.2}$O (x=0.6) of Example 1-1 as a positive electrode active material.

FIG. 6 shows evaluation results of a capacity retention characteristic of a discharging capacity of an electrochemical cell using the composite oxide $Li_{0.6}Ti_{0.2}Mn_{0.2}O$ (x=0.6) of Example 1-1 as a positive electrode active material. Charging and discharging capacities in cycles are shown when charging and discharging were repeated over 4 cycles at a current density of 5 mA/g and in a voltage range of 1.5 to 4.8 V. The discharging capacity in the fourth cycle was 300 mAh/g showing a discharging capacity of 95% of the discharging capacity in the first cycle, and a high discharging capacity retention rate was shown.

Example 1-2

Figure 7:
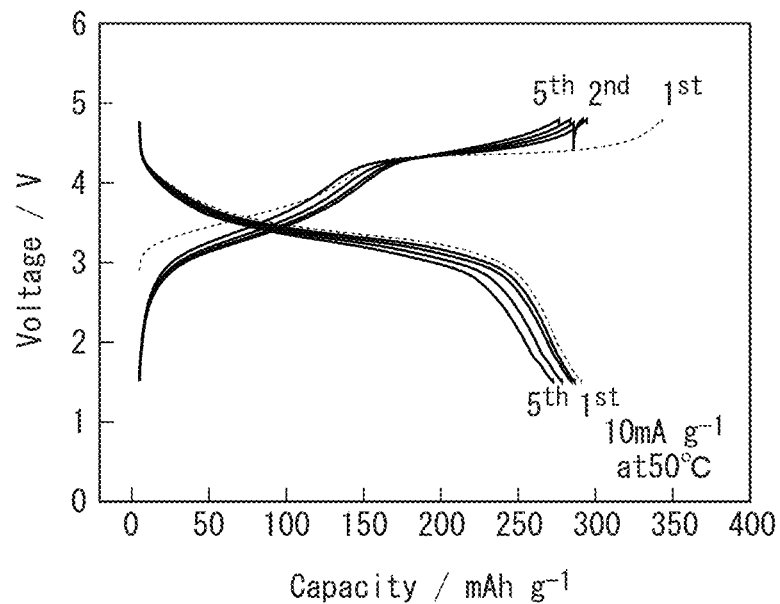
FIG. 7 shows charging and discharging characteristics of an electrochemical cell measured under conditions of Example 1-2 using a composite oxide Li$_{0.6}$Ti$_{0.2}$Mn$_{0.2}$O (x=0.6) as a positive electrode active material.

Example 1-2 was different from Example 1-1 only in that charging and discharging characteristics were measured at a current density increased to 10 mA/g and the other conditions were the same as those in Example 1-1. FIG. 7 shows charging and discharging characteristics of an electrochemical cell measured under conditions of Example 1-2 using a composite oxide $Li_{0.6}Ti_{0.2}Mn_{0.2}O$ (x=0.6) as a positive electrode active material. Curves upward to the right correspond to charging curves and curves downward to the right correspond to discharging curves.

Under conditions of Example 1-2 also, similarly to Example 1-1, large charging and discharging capacities and a high discharging capacity retention rate were shown. A charging capacity was 350 mAh/g and a discharging capacity was 300 mAh/g in the first cycle. In addition, even after charging and discharging were repeated over 5 cycles, a high discharging capacity retention rate of 92% was shown. That is, even if the current density was high, an electrochemical cell using the composite oxide $Li_{0.6}Ti_{0.2}Mn_{0.2}O$ (x=0.6) as a positive electrode active material functioned normally.

Example 1-3

Figure 8:
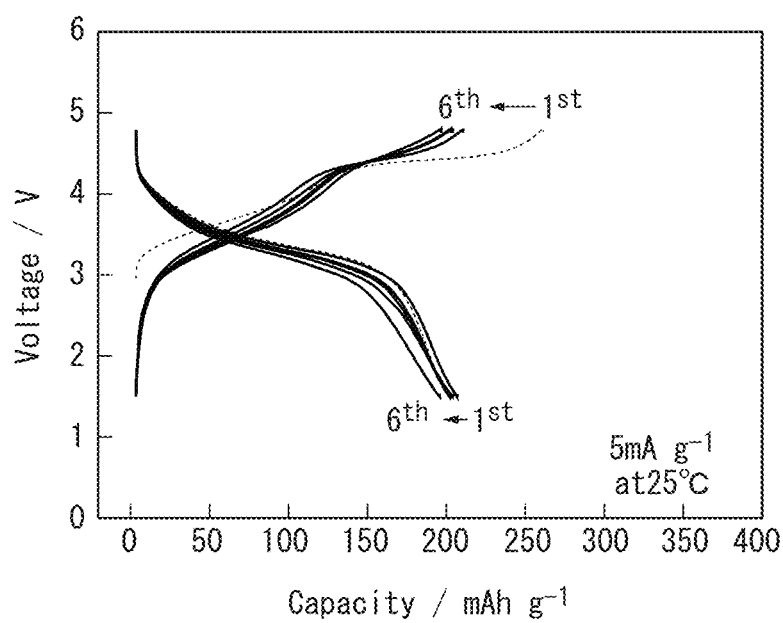
FIG. 8 shows charging and discharging characteristics of an electrochemical cell measured under conditions of Example 1-3 using a composite oxide Li$_{0.6}$Ti$_{0.2}$Mn$_{0.2}$O (x=0.6) as a positive electrode active material.

Example 1-3 was different from Example 1-1 only in that charging and discharging characteristics were measured at a measurement temperature that was room temperature (25° C.) and the other conditions were the same as those in Example 1-1. FIG. 8 shows charging and discharging characteristics of an electrochemical cell measured under conditions of Example 1-3 using a composite oxide $Li_{0.6}Ti_{0.2}Mn_{0.2}O$ (x=0.6) as a positive electrode active material. Curves upward to the right correspond to charging curves and curves downward to the right correspond to discharging curves.

Under conditions of Example 1-3, a charging capacity was 275 mAh/g and a discharging capacity was 215 mAh/g in the first cycle. While charging and discharging characteristics were lowered when the measurement temperature decreased, sufficiently high charging and discharging characteristics were shown. In addition, even after charging and discharging were repeated over 5 cycles, the discharging capacity did not largely decrease and a high discharging capacity retention rate of 93% was shown.

Figure 9:
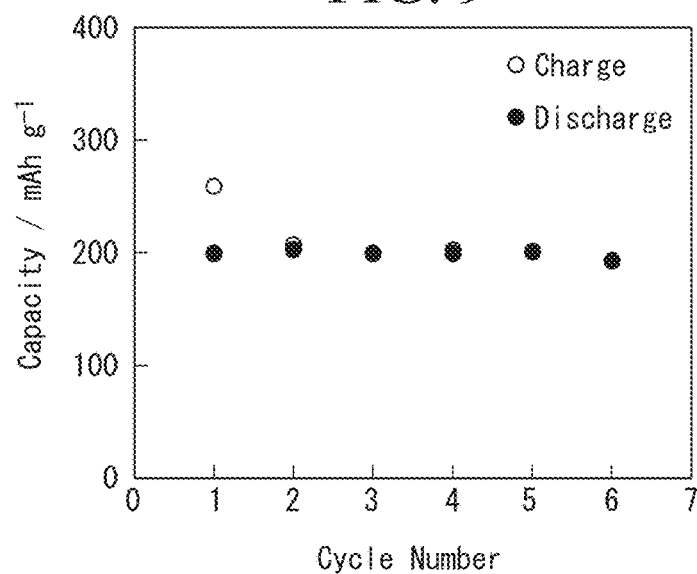
FIG. 9 shows evaluation results of a capacity retention characteristic of a discharging capacity of an electrochemical cell under conditions of Example 1-3 using a composite oxide Li$_{0.6}$Ti$_{0.2}$Mn$_{0.2}$O (x=0.6) as a positive electrode active material.

FIG. 9 shows evaluation results of capacity retention characteristics of a discharging capacity of an electrochemical cell under conditions of Example 1-3 using a composite oxide $Li_{0.6}Ti_{0.2}Mn_{0.2}O$ (x=0.6) as a positive electrode active material.

Example 2

$Li_{0.55}Ti_{0.1}Mn_{0.35}O$ corresponding to General Formula:

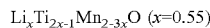
$Li_xTi_{2x-1}Mn_{2-3x}O$ (x=0.55)

$Li_{0.55}Ti_{0.1}Mn_{0.35}O$ was prepared in the same manner as in a composite oxide $Li_{0.6}Ti_{0.2}Mn_{0.2}O$ (x=0.6) prepared in Example 1-1. $Li_2CO_3$, $TiO_2$, and $Mn_2O_3$ were weighed out at a molar ratio of 1.1:0.4:0.7. Then, the weighed out powders were mixed so that they became sufficiently uniform, and were then pelletized, and calcined at 900° C. for 12 hours, and thereby $Li_{0.55}Ti_{0.1}Mn_{0.35}O$ was obtained. In this case, the calcination atmosphere was an inert gas atmosphere.

The weighed out sample was calcined at 900° C. for 12 hours, and the calcined sample was finely ground using a ball mill under the same conditions as in Example 1-1.

Figure 10:
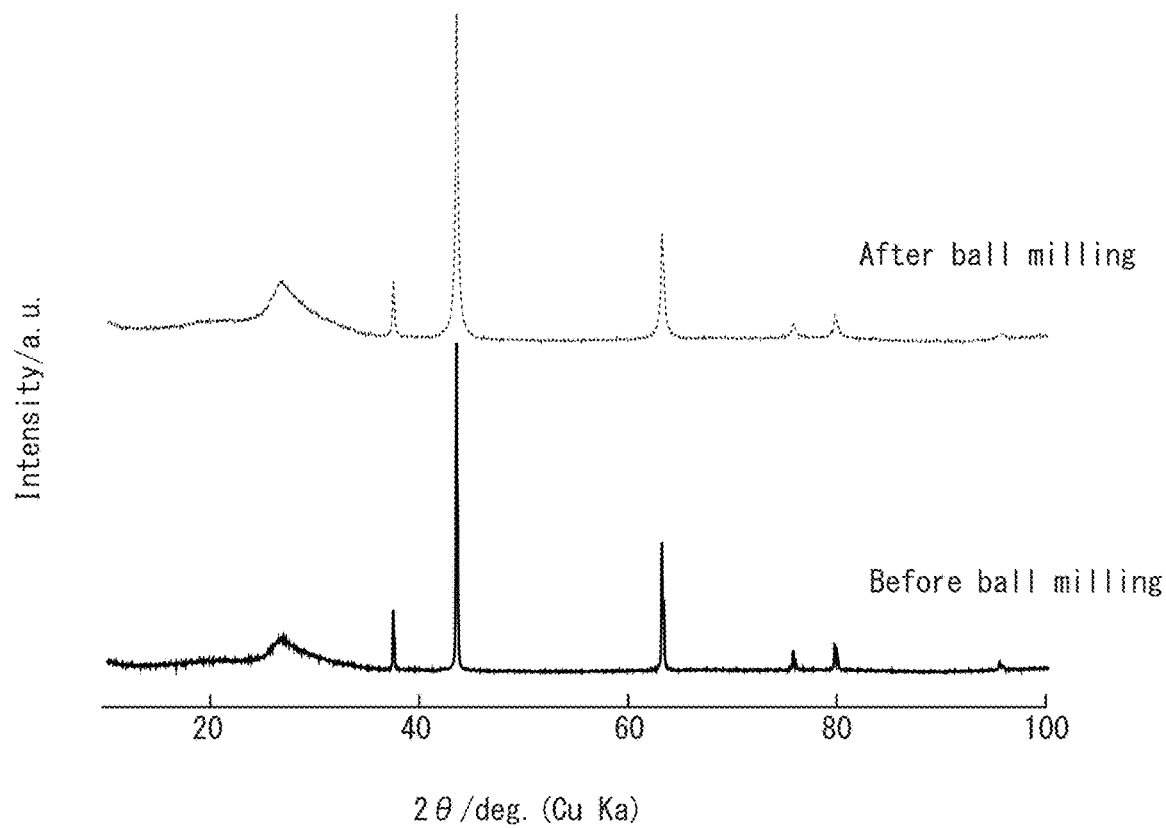
FIG. 10 shows X-ray diffraction images before and after ball milling is performed on a powder of a composite oxide obtained in Example 2.

FIG. 10 shows X-ray diffraction images before and after ball milling was performed on the powder of the composite oxide obtained in Example 2. The horizontal axis represents a diffraction angle (2θ) and the vertical axis represents an intensity. It was confirmed that a crystal structure of the composite oxide obtained in Example 2 from the X-ray diffraction image was a rock salt type structure. In addition, the composition was analyzed by inductivity coupled plasma (ICP) analysis and it was confirmed that the composition was $Li_{0.55}Ti_{0.1}Mn_{0.35}O$ (x=0.55).

Figure 11:
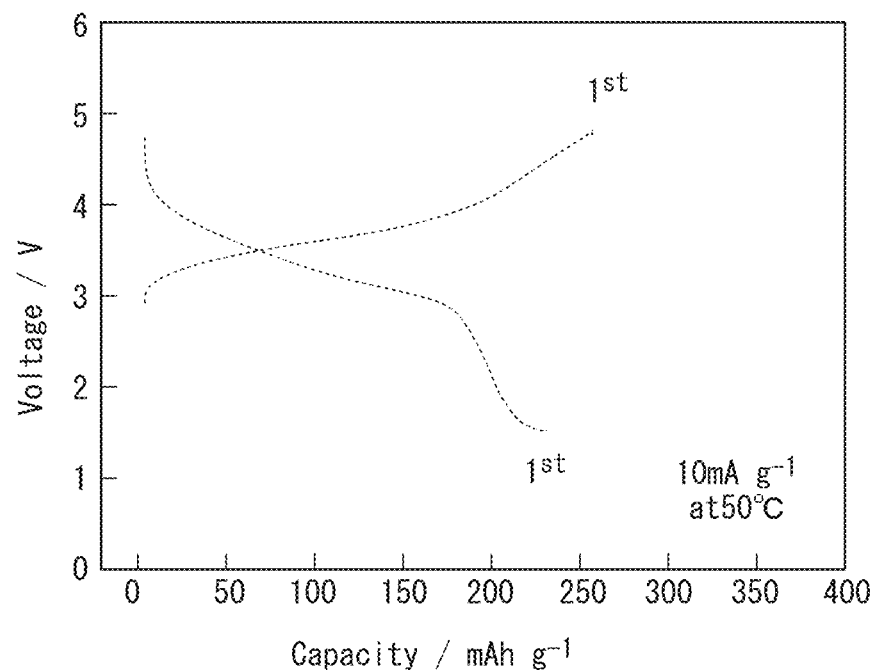
FIG. 11 shows charging and discharging characteristics of an electrochemical cell obtained using a composite oxide Li$_{0.55}$Ti$_{0.1}$Mn$_{0.35}$O (x=0.55) of Example 2 as a positive electrode active material.

FIG. 11 shows charging and discharging characteristics of an electrochemical cell obtained using a composite oxide $Li_{0.55}Ti_{0.1}Mn_{0.35}O$ (x=0.55) of Example 2 as a positive electrode active material. A curve upward to the right corresponds to a charging curve and a curve downward to the right corresponds to a discharging curve. Charging and discharging capacities measured under conditions of a current density of 10 mA/g, a voltage range of 1.5 to 4.8 V, and a measurement temperature of 50° C. are shown.

As shown in FIG. 11, large charging and discharging capacities in which a charging capacity was 260 mAh/g and a discharging capacity was 230 mAh/g in the first cycle were obtained. An initial charging capacity of 260 mAh/g corresponded to about 71% of a Li-based theoretical capacity of 394.9 mAh/g, which indicated a high value. The large charging and discharging capacities were caused by oxidation reduction reactions of oxide ions ($O^{2-}/O_2^{2-}$).

Example 3

$Li_{0.62}Ti_{0.245}Mn_{0.135}O$ corresponding to General Formula:

$Li_xTi_{2x-1}Mn_{2-3x}O$ (x=0.62)

$Li_{0.62}Ti_{0.245}Mn_{0.135}O$ was prepared in the same manner as in Example 1-1 in which a composite oxide $Li_{0.6}Ti_{0.2}Mn_{0.2}O$ (x=0.6) was prepared. $Li_2CO_3$, $TiO_2$, and $Mn_2O_3$ were weighed out at a molar ratio of 1.24:0.96:0.27. Then, the weighed out powders were mixed so that they became sufficiently uniform, and were then pelletized, and calcined at 900° C. for 12 hours, and thereby $Li_{0.62}Ti_{0.245}Mn_{0.135}O$ was obtained. In this case, a calcination atmosphere was an inert gas atmosphere.

The weighed out sample was calcined at 900° C. for 12 hours, and the calcined sample was finely ground using a ball mill under the same conditions as in Example 1-1.

Figure 12:
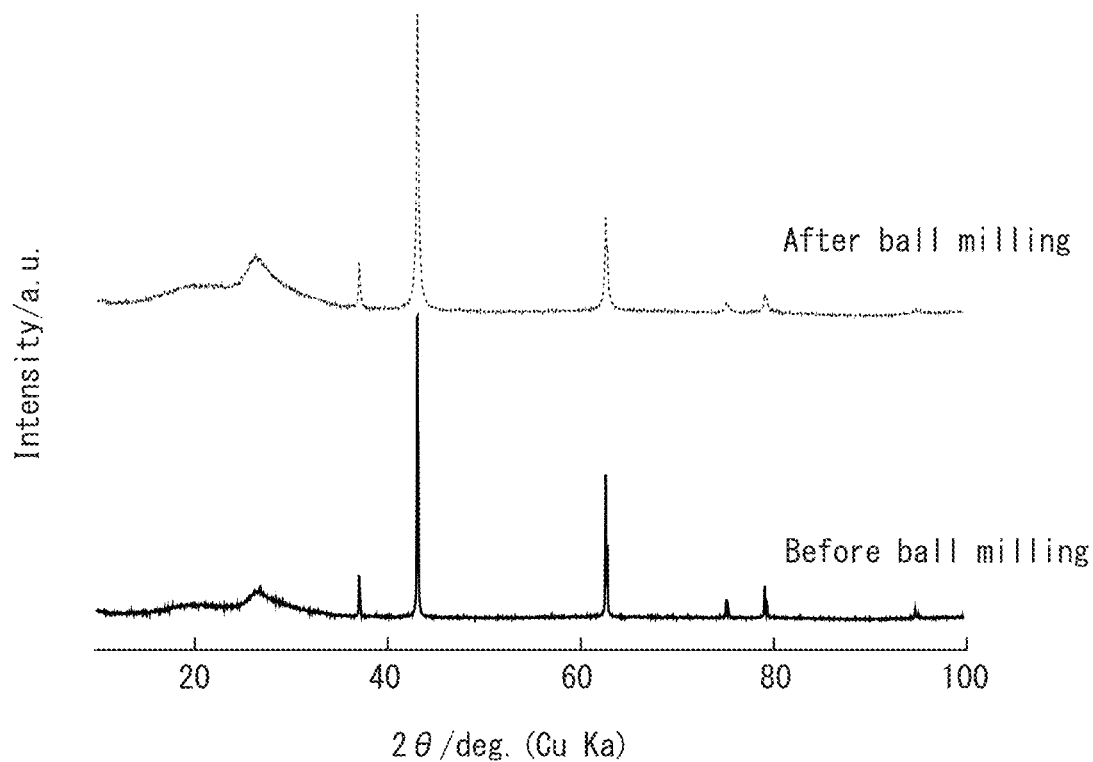
FIG. 12 shows X-ray diffraction images before and after ball milling is performed on a powder of a composite oxide obtained in Example 3.

FIG. 12 shows X-ray diffraction images before and after ball milling was performed on the powder of the composite oxide obtained in Example 3. The horizontal axis represents a diffraction angle (2θ) and the vertical axis represents an intensity. It was confirmed that a crystal structure of the composite oxide obtained in Example 2 from the X-ray diffraction image was a rock salt type structure. In addition, the composition was analyzed by inductivity coupled plasma (ICP) analysis and it was confirmed that the composition was $Li_{0.62}Ti_{0.245}Mn_{0.135}O$ (x=0.62).

Figure 13:
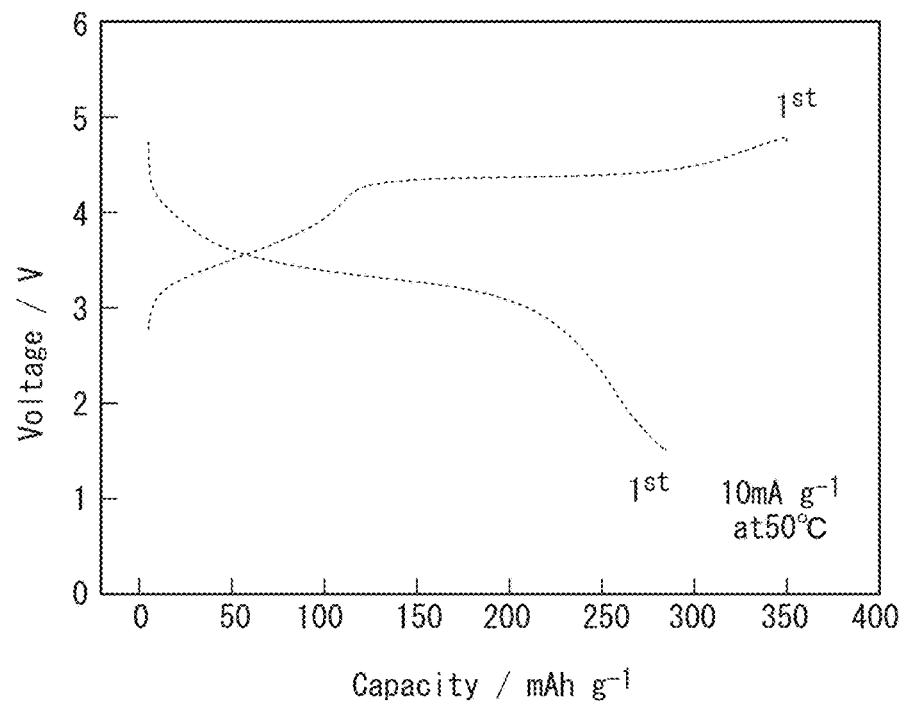
FIG. 13 shows charging and discharging characteristics of an electrochemical cell obtained using a composite oxide Li$_{0.62}$Ti$_{0.245}$Mn$_{0.135}$O (x=0.62) of Example 3 as a positive electrode active material.

FIG. 13 shows charging and discharging characteristics of an electrochemical cell obtained using a composite oxide $Li_{0.62}Ti_{0.245}Mn_{0.135}O$ (x=0.62) of Example 3 as a positive electrode active material. A curve upward to the right corresponds to a charging curve and a curve downward to the right corresponds to a discharging curve. Charging and discharging capacities measured under conditions of a current density of 10 mA/g, a voltage range of 1.5 to 4.8 V, and a measurement temperature of 50° C. are shown.

As shown in FIG. 13, large charging and discharging capacities in which a charging capacity was 350 mAh/g and a discharging capacity was 280 mAh/g in the first cycle were obtained. An initial charging capacity of 350 mAh/g corresponded to about 89% of a Li-based theoretical capacity of 394.9 mAh/g, which indicated a very high value. The large charging and discharging capacities were caused by oxidation reduction reactions of oxide ions ($O^{2-}/O_2^{2-}$).

Based on results of Example 1-1, Example 2, and Example 3, even if a composite oxide in which a range of x in General Formula: $Li_xTi_{2x-1}Mn_{2-3x}O$ was changed was used as a positive electrode material, a rock salt type structure was maintain and high charging and discharging characteristics were exhibited. In addition, comparing Example 2 and Example 3, when a compositional proportion of Ti was higher, the contribution of oxide ions to oxidation reduction in charge compensation according to movement of lithium ions during charging and discharging was greater and it was possible to obtain high charging and discharging characteristics.

Reference Example 1

$Li_{0.625}Ti_{0.1}Nb_{0.075}Mn_{0.2}O$ corresponding to General Formula:

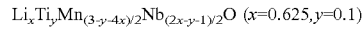
$Li_xTi_yMn_{(3-y-4x)/2}Nb_{(2x-y-1)/2}O$ (x=0.625, y=0.1)

$Li_{0.625}Ti_{0.1}Nb_{0.075}Mn_{0.2}O$ was prepared in the same manner as in Example 1-1 in which a composite oxide $Li_{0.6}Ti_{0.2}Mn_{0.2}O$ (x=0.6) was prepared and by additionally adding $Nb_2O_5$ (commercially available from Wako Pure Chemical Corporation). $Li_2CO_3$, $TiO_2$, $Mn_2O_3$, and $Nb_2O_5$ were weighed out at a molar ratio of 1.25:0.4:0.4:0.15. Then, the weighed out powders were mixed so that they became sufficiently uniform, and were then pelletized, and calcined at 900° C. for 12 hours, and thereby 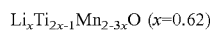 $Li_{0.625}Ti_{0.1}Nb_{0.075}Mn_{0.2}O$ was obtained. In this case, a calcination atmosphere was an inert gas atmosphere.

Figure 14:
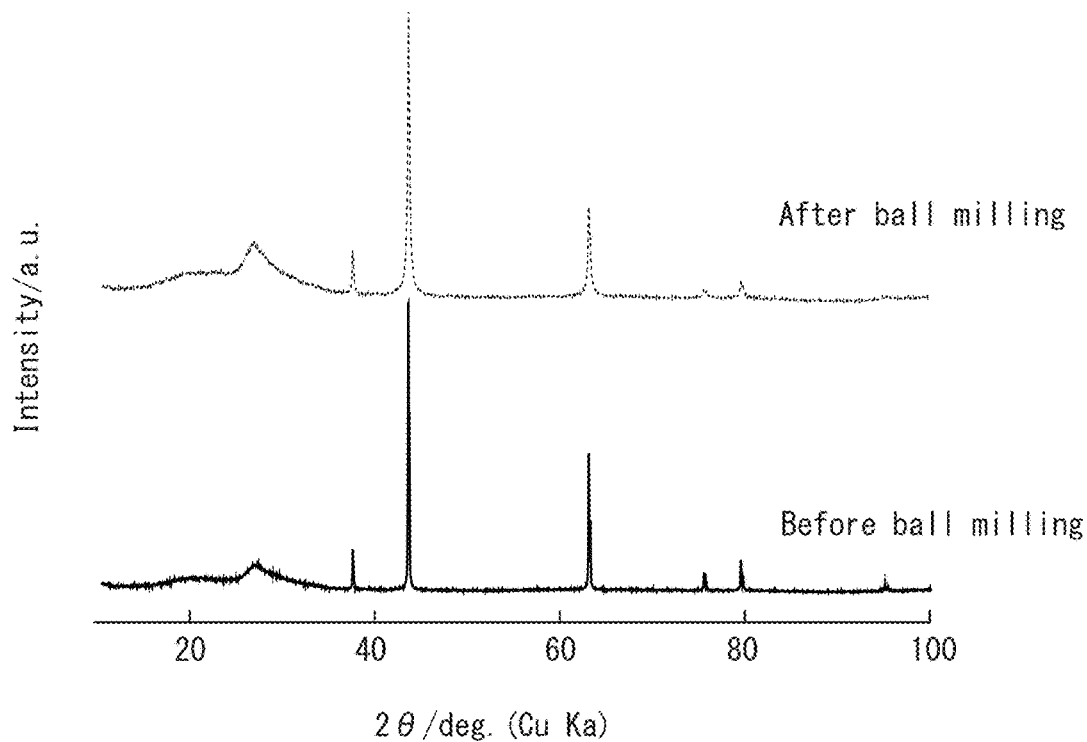
FIG. 14 shows X-ray diffraction images before and after ball milling is performed on a powder of a composite oxide obtained in Reference Example 1.

FIG. 14 shows X-ray diffraction images before and after ball milling is performed on a powder of a composite oxide obtained in Reference Example 1. The horizontal axis represents a diffraction angle (2θ) and the vertical axis represents an intensity. It was confirmed that a crystal structure of the composite oxide obtained in Reference Example 1 from the X-ray diffraction image was a rock salt type structure. In addition, the composition was analyzed by inductivity coupled plasma (ICP) analysis, and it was confirmed that the composition was $Li_{0.625}Ti_{0.1}Nb_{0.075}Mn_{0.2}O$ (x=0.625, y=0.1).

Figure 15:
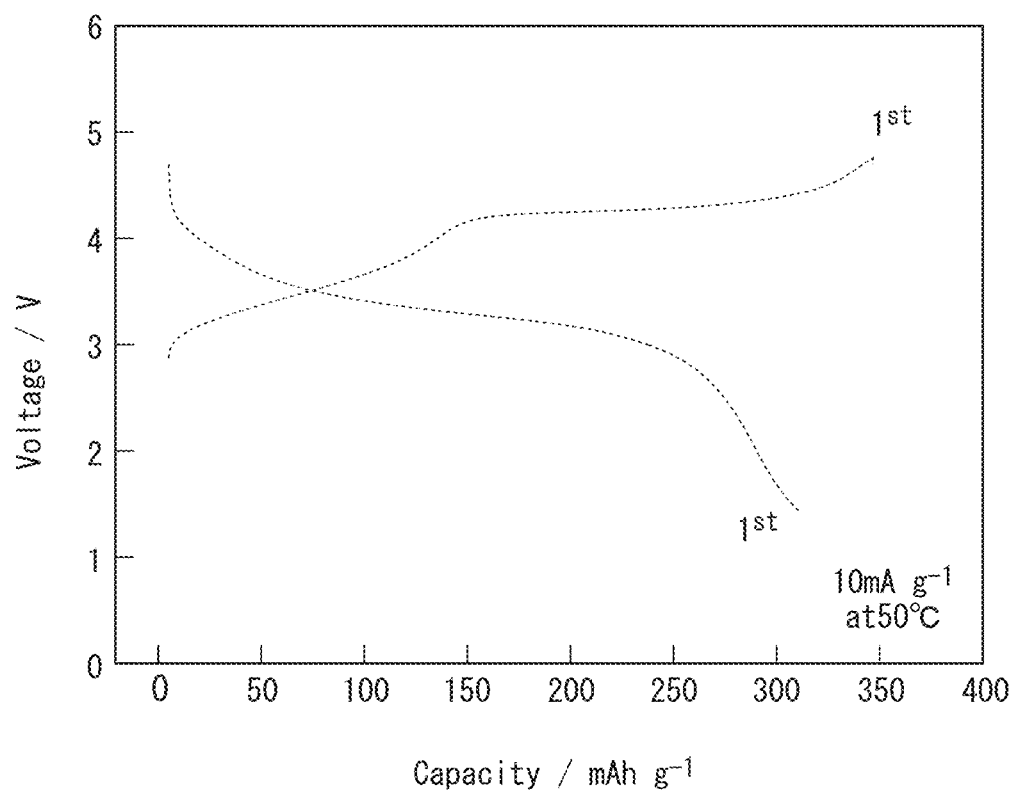
FIG. 15 shows charging and discharging characteristics of an electrochemical cell obtained using a composite oxide Li$_{0.625}$Ti$_{0.1}$Nb$_{0.075}$Mn$_{0.2}$O (x=0.625, y=0.1) in Reference Example 1 as a positive electrode active material.

FIG. 15 shows charging and discharging characteristics of an electrochemical cell obtained using a composite oxide $Li_{0.625}$ $Ti_{0.1}Nb_{0.075}Mn_{0.2}O$ (x=0.625, y=0.1) of Reference Example 1 as a positive electrode active material. A curve upward to the right corresponds to a charging curve and a curve downward to the right corresponds to a discharging curve. Charging and discharging capacities measured under conditions of a current density of 10 mA/g, a voltage range of 1.5 to 4.8 V, and a measurement temperature of 50° C. are shown.

As shown in FIG. 15, large charging and discharging capacities in which a charging capacity was 340 mAh/g and a discharging capacity was 310 mAh/g in the first cycle were obtained. The large charging and discharging capacities were caused by oxidation reduction reactions of oxide ions ($O^{2-}/O_2^{2-}$).

As shown in Reference Example 1, the composition of General Formula (2) in which a part of the composition of General Formula (1) shown in Example 1-1 to Example 3 was substituted with Nb also exhibited high charging and discharging characteristics.

EXPLANATION OF REFERENCES

1 Battery
2 Control unit
3 Display unit
4 Operation unit
5 Communication unit
6 Antenna
10 Mobile phone
11 Battery module
12 Inverter
13 Monitor
14 Control unit
15 Wheel
20 Electric vehicle

What is claimed is:

1. A positive electrode active material for a lithium ion secondary battery having a rock salt type structure represented by General Formula:

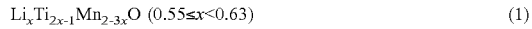

$Li_xTi_{2x-1}Mn_{2-3x}O$ (0.55≤x<0.63)     (1)

and having an average particle size of 0.5 µm or less.

2. The positive electrode active material for a lithium ion secondary battery according to claim 1,
wherein, in charge compensation according to movement of lithium ions during charging and discharging, the contribution of oxide ions to oxidation reduction is equal to or greater than the contribution of transition metal ions contained in a solid solution to oxidation reduction.

3. A positive electrode for a lithium ion secondary battery comprising the positive electrode active material for a lithium ion secondary battery according to claim 1, a conductive material, and a binder.

4. A lithium ion secondary battery comprising the positive electrode for a lithium ion secondary battery according to claim 3, a negative electrode, and a nonaqueous electrolyte.

5. The lithium ion secondary battery according to claim 4, wherein an initial charging capacity is 260 mAh/g or more.

6. An electronic device comprising the lithium ion secondary battery according to claim 5 as a drive power source.

7. A vehicle comprising the lithium ion secondary battery according to claim 5 as a drive power source.

8. A positive electrode active material for a lithium ion secondary battery having a rock salt type structure represented by General Formula:

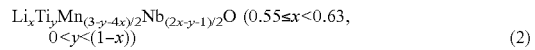

$Li_xTi_yMn_{(3-y-4x)/2}Nb_{(2x-y-1)/2}O$ (0.55≤x<0.63, 0<y<(1−x))     (2)

and having an average particle size of 0.5 µm or less.

9. The positive electrode active material for a lithium ion secondary battery according to claim 8,
wherein, in charge compensation according to movement of lithium ions during charging and discharging, the contribution of oxide ions to oxidation reduction is equal to or greater than the contribution of transition metal ions contained in a solid solution to oxidation reduction.

10. A positive electrode for a lithium ion secondary battery comprising the positive electrode active material for a lithium ion secondary battery according to claim 8, a conductive material, and a binder.

11. A lithium ion secondary battery comprising the positive electrode for a lithium ion secondary battery according to claim 10, a negative electrode, and a nonaqueous electrolyte.

12. The lithium ion secondary battery according to claim 11, wherein an initial charging capacity is 260 mAh/g or more.

13. An electronic device comprising the lithium ion secondary battery according to claim 12 as a drive power source.

14. A vehicle comprising the lithium ion secondary battery according to claim 12 as a drive power source.

* * * * *